(12) United States Patent
Kumetani

(10) Patent No.: US 10,484,443 B2
(45) Date of Patent: Nov. 19, 2019

(54) DISTRIBUTION APPARATUS, DISTRIBUTION CONTROL METHOD, AND DISTRIBUTION SYSTEM

(71) Applicant: Sharp Kabushiki Kaisha, Sakai, Osaka (JP)

(72) Inventor: Kohji Kumetani, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 113 days.

(21) Appl. No.: 15/825,199

(22) Filed: Nov. 29, 2017

(65) Prior Publication Data

US 2018/0159908 A1 Jun. 7, 2018

(30) Foreign Application Priority Data

Dec. 7, 2016 (JP) .................................. 2016-237677

(51) Int. Cl.
*G06F 15/16* (2006.01)
*H04L 29/06* (2006.01)
*G06F 3/0482* (2013.01)
*G06F 16/00* (2019.01)
*H04W 8/08* (2009.01)

(52) U.S. Cl.
CPC ........ *H04L 65/4084* (2013.01); *G06F 3/0482* (2013.01); *G06F 16/00* (2019.01); *H04W 8/08* (2013.01)

(58) Field of Classification Search
CPC ... H04L 65/4084; G06F 16/00; G06F 3/0482; H04M 1/72566; H04W 8/08

USPC ......................................................... 709/201
See application file for complete search history.

(56) References Cited

U.S. PATENT DOCUMENTS

| | | | | |
|---|---|---|---|---|
| 2011/0044227 A1* | 2/2011 | Harrang | ................. | H04H 20/42 370/312 |
| 2013/0346578 A1* | 12/2013 | Varki | ..................... | H04L 47/28 709/223 |
| 2014/0153047 A1* | 6/2014 | Tsushima | ............... | G06Q 10/06 358/1.15 |
| 2014/0304366 A1* | 10/2014 | Fletcher | ............ | H04N 21/2387 709/217 |

FOREIGN PATENT DOCUMENTS

JP          2004-145538 A      5/2004

* cited by examiner

*Primary Examiner* — Wing F Chan
*Assistant Examiner* — Joseph R Maniwang
(74) *Attorney, Agent, or Firm* — Keating & Bennett, LLP

(57) ABSTRACT

A network system includes a server, and the server distributes content and its presentation schedule to a content presentation apparatus at a distribution destination in accordance with an operation performed by an administrator. At this time, not only the business hours in a place where the server is installed and the business hours in a place where the content presentation apparatus is installed, but also the time difference is taken into consideration. When the time difference is taken into consideration, the server distributes content and its presentation schedule to the content presentation apparatus at the distribution destination outside the overlapping business hours in both places.

6 Claims, 13 Drawing Sheets

CALENDAR SCHEDULE

| PRESENTATION PLACE | USA (NY) | ▼ | 102 |
| YEAR / MONTH | 2016/12 | ▼ | 104 |

|  | SUN | MON | TUE | WED | THU | FRI | SAT |
|---|---|---|---|---|---|---|---|
| 1st |  |  |  |  | 1<br>12/1 11-<br>12/2 10<br>(12/2 02-<br>12/3 01) | 2 | 3 |
| 2nd | 4 | 5 | 6 | 7 | 8 | 9 | 10 |
| 3rd | 11 | 12 | 13 | 14 | 15 | 16 | 17 |
| 4th | 18 | 19 | 20 | 21 | 22 | 23 | 24 |
| 5th | 25 | 26 | 27 | 28 | 29 | 30 | 31 |

106

FIG. 13
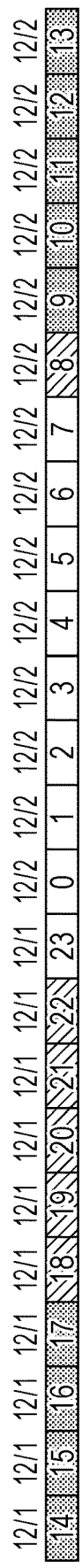

DISTRIBUTION APPARATUS, DISTRIBUTION CONTROL METHOD, AND DISTRIBUTION SYSTEM

BACKGROUND

1. Field

The present disclosure relates to a distribution apparatus, a distribution control program, a distribution control method, and a distribution system, and more particularly relates to a distribution apparatus, a distribution control program, a distribution control method, and a distribution system that distribute content such as a still image or a video image displayed on a display system.

2. Description of the Related Art

An exemplary distribution apparatus of this type is disclosed in Japanese Unexamined Patent Application Publication No. 2004-145538. In a content distribution system disclosed in Japanese Unexamined Patent Application Publication No. 2004-145538, when distributing content to a user terminal via a network, a content providing server creates a content distribution schedule on the basis of a first parameter which is a distribution time period of content requested by a user, a second parameter which is a destination to which content is presented, and a third parameter which is the amount of traffic on a mobile communication network predicted at each time point, and distributes certain content to the user terminal on the basis of the created distribution schedule.

However, the technology disclosed in Japanese Unexamined Patent Application Publication No. 2004-145538 assumes that the providing server and the user terminal are installed in one or more countries or regions where there is no time difference. If the providing server and the user terminal are installed in one or more countries or regions where there is a time difference, content will not be transmitted (distributed) in a time period requested by the user terminal.

SUMMARY

It is desirable to provide a novel distribution apparatus, distribution control program, distribution control method, and distribution system.

It is additionally desirable to provide a distribution apparatus, a distribution control program, a distribution control method, and a distribution system capable of distributing content by taking into consideration not only the amount of traffic but also a time difference with a place where a display system is installed.

According to an aspect of the disclosure, there is provided a distribution apparatus that distributes content and a presentation schedule of the content to a plurality of content presentation apparatuses. The distribution apparatus includes a storage device, a distribution time determination unit, and a distribution unit. The storage device stores a first time period where traffic of a network in a first place where the distribution apparatus is installed is not congested and a second time period where the content is not presented by each of the plurality of content presentation apparatuses or where there are a few people who receive presentation of the content in association with a second place where each of the plurality of content presentation apparatuses is installed. The distribution time determination unit determines, upon determination of a content presentation apparatus at a distribution destination, the content to be distributed, and the presentation schedule to be distributed, a time period where the first time period and the second time period for the content presentation apparatus at the distribution destination overlap as a distribution time by taking into consideration a time difference between the first place and the second place where the content presentation apparatus at the distribution destination is installed. The distribution unit distributes the content and the presentation schedule to the content presentation apparatus at the distribution destination at the distribution time determined by the distribution time determination unit.

According to another aspect of the disclosure, there is provided a distribution control program that runs on a computer that distributes content and a presentation schedule of the content to a plurality of content presentation apparatuses. The computer includes a storage device that stores a first time period where traffic of a network in a first place where a distribution apparatus is installed is not congested and a second time period where the content is not presented by each of the plurality of content presentation apparatuses or where there are a few people who receive presentation of the content in association with a second place where each of the plurality of content presentation apparatuses is installed. The program causes a processor of the computer to execute a process including: determining, upon determination of a content presentation apparatus at a distribution destination, the content to be distributed, and the presentation schedule to be distributed, a time period where the first time period and the second time period for the content presentation apparatus at the distribution destination overlap as a distribution time by taking into consideration a time difference between the first place and the second place where the content presentation apparatus at the distribution destination is installed; and distributing the content and the presentation schedule to the content presentation apparatus at the distribution destination at the determined distribution time.

According to another aspect of the disclosure, there is provided a distribution control method for a distribution apparatus that distributes content and a presentation schedule of the content to a plurality of content presentation apparatuses. The distribution apparatus include a storage device that stores a first time period where traffic of a network in a first place where the distribution apparatus is installed is not congested and a second time period where the content is not presented by each of the plurality of content presentation apparatuses or where there are a few people who receive presentation of the content in association with a second place where each of the plurality of content presentation apparatuses is installed. The distribution control method includes: determining, upon determination of a content presentation apparatus at a distribution destination, the content to be distributed, and the presentation schedule to be distributed, a time period where the first time period and the second time period for the content presentation apparatus at the distribution destination overlap as a distribution time by taking into consideration a time difference between the first place and the second place where the content presentation apparatus at the distribution destination is installed; and distributing the content and the presentation schedule to the content presentation apparatus at the distribution destination at the determined distribution time.

According to yet another aspect of the disclosure, there is provided a distribution system including a plurality of content presentation apparatuses, and a distribution apparatus that distributes content and a presentation schedule of the content to the plurality of content presentation apparatuses. Each of the plurality of content presentation apparatuses includes a receiving unit and a presentation unit. The receiving unit receives the content and the presentation schedule distributed from the distribution apparatus. The presentation unit presents the content received by the receiving unit in accordance with the presentation schedule received by the receiving unit. The distribution apparatus includes a storage device, a distribution time determination unit, and a distribution unit. The storage device stores a first time period where traffic of a network in a first place where the distribution apparatus is installed is not congested and a second time period where the content is not presented by each of the plurality of content presentation apparatuses or where there are a few people who receive presentation of the content in association with a second place where each of the plurality of content presentation apparatuses is installed. The distribution time determination unit determines, upon determination of a content presentation apparatus at a distribution destination, the content to be distributed, and the presentation schedule to be distributed, a time period where the first time period and the second time period for the content presentation apparatus at the distribution destination overlap as a distribution time by taking into consideration a time difference between the first place and the second place where the content presentation apparatus at the distribution destination is installed. The distribution unit distributes the content and the presentation schedule to the content presentation apparatus at the distribution destination at the distribution time determined by the distribution time determination unit.

BRIEF DESCRIPTION OF THE DRAWINGS

FIG. 2 is an illustration of an example of a calendar schedule screen displayed on a display device connected to a server illustrated in FIG. 1;

FIG. 13 is an illustration for describing a method of determining a content distribution time according to a third embodiment.

DESCRIPTION OF THE EMBODIMENTS

First Embodiment

Figure 1:
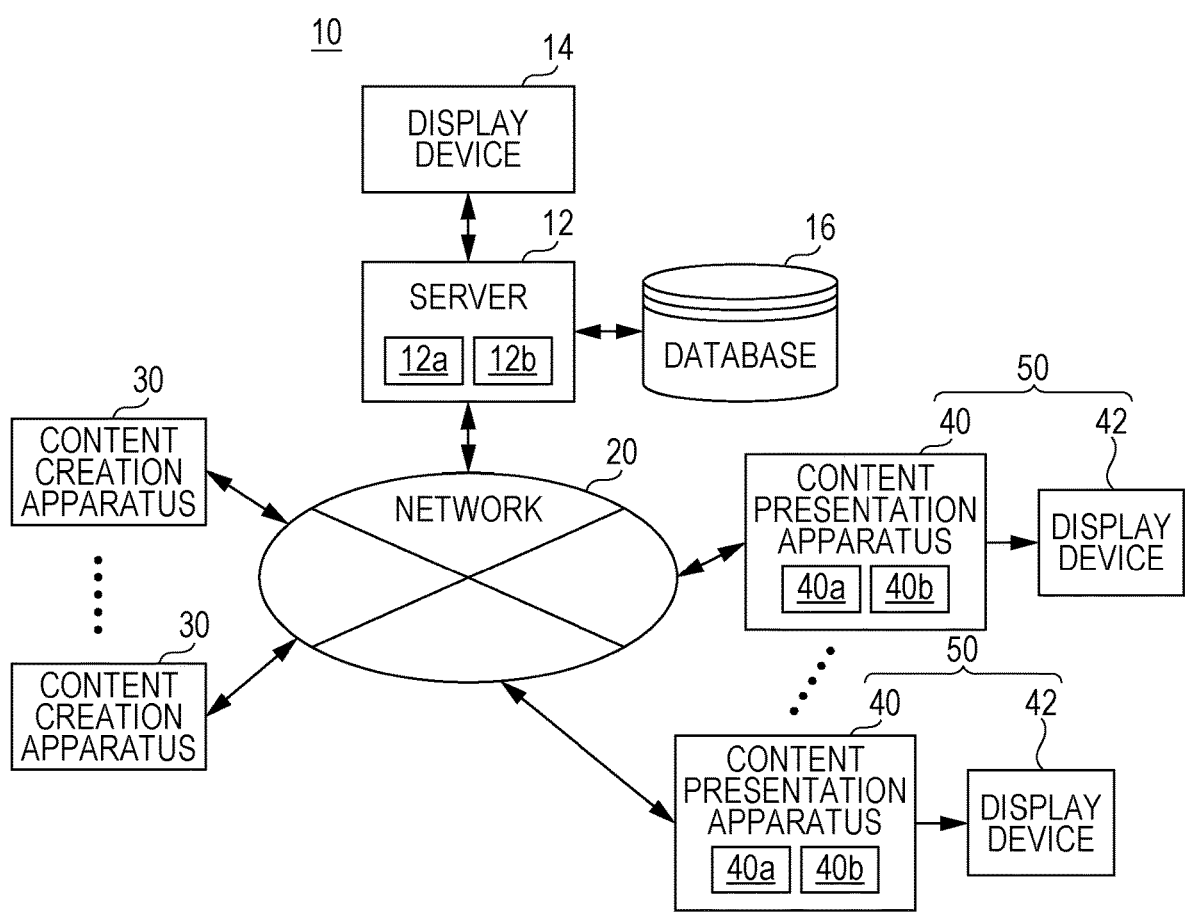
FIG. 1 is an illustration of an example of the configuration of a network system according to a first embodiment of the present disclosure.

FIG. 1 is an illustration of an example of a network system 10. Referring to FIG. 1, the network system 10 according to a first embodiment includes a server 12. A display device 14 and a database 16 are connected to the server 12. The server 12 is connected to a plurality of content creation apparatuses 30 and a plurality of content presentation apparatuses 40 via a network 20 such as the Internet and a local area network (LAN).

In the first embodiment, it is illustrated that the plurality of content creation apparatuses 30 are connected to the server 12 via the network 20; however, there may be only one content creation apparatus 30 (hereinafter, the content creation apparatuses 30 will be collectively referred to as one content creation apparatus 30).

The server 12 is a general server and includes circuit components such as a CPU 12*a*, RAM 12B, and a communication module. The server 12 functions as a management apparatus that manages content stored in the database 16, and also functions as a setting apparatus that sets a content presentation schedule and as a distribution apparatus that distributes content. The display device 14 is a general monitor such as a liquid crystal display (LCD). The database 16 is a general database and stores various items of content to be distributed to the plurality of content presentation apparatuses 40 (hereinafter, the content presentation apparatuses 40 may sometimes be collectively referred to as one content presentation apparatus 40 for the sake of convenience).

An input device such as a keyboard (not illustrated) is connected to the server 12.

The database 16 may be provided in the server 12, or may be connected to be capable of communicating with the server 12 via the network 20.

The content creation apparatus 30 is a general personal computer (PC) and includes circuit components such as a CPU, RAM, and a communication module (all of them are not illustrated). A monitor and an input device (both are not illustrated) are connected to or integrated with the content creation apparatus 30.

The content presentation apparatus 40 is a general PC and includes circuit components such as a CPU 40*a*, RAM 40*b*, and a communication module. In addition, a display device 42 is connected to the content presentation apparatus 40. An input device (not illustrated) is connected to the content presentation apparatus 40. For example, the content presentation apparatus 40 and the display device 42 connected to the content presentation apparatus 40 may be referred to as a "display system" 50 as a whole.

In the above-described network system 10, content created using the content creation apparatus 30 is uploaded to (registered in) the server 12 via the network 20, and the server 12 stores the uploaded content in the database 16 and manages the content. In the first embodiment, content is a still image or a video image (moving image) to be displayed on the display device 42. Note that content may be loaded to the server 12 off-line using a storage medium such as Universal Serial Bus (USB) memory, compact disc (CD), or digital versatile disc (DVD).

Note that content is not construed to be limited to a still image or a video image, and sound (music) instead of or along with a still image or a video image may be output. In this case, a loudspeaker (not illustrated) included in the display device 42 or a loudspeaker (not illustrated) connected to the content presentation apparatus 40 is used.

In the network system 10, a user such as an administrator who manages or uses the server 12 (hereinafter referred to as an "administrator") sets a schedule (presentation schedule) for reproducing (outputting) content with the use of the content presentation apparatus 40. The server 12 distributes (transmits) a presentation schedule set by the administrator and content to be reproduced in accordance with the presentation schedule to the content presentation apparatus 40 at the distribution destination. As will be described later, the presentation schedule includes a calendar schedule and a time schedule.

The display device 42 (display system 50) is applied to facilities and places where people gather, such as train stations, shopping malls, department stores, and theme parks, and presents content to an unspecified number of people. Therefore, the display device 42 (display system 50) generally presents content in the business hours of a facility to which the display device 42 (display system 50) is applied. Therefore, the display device 42 (display system 50) generally does not present content outside the business hours of a facility to which the display device 42 (display system 50) is applied. For example, the power of the display device 42 (display system 50) is turned off.

In the business hours of an organization to which the administrator of the server 12 belongs, the traffic of the network 20 such as a LAN in a place where the server 12 is installed is congested. Thus, in a general content distribution system, content and its presentation schedule are distributed to the content presentation apparatus 40 outside the business hours, when the traffic is not congested.

When the content presentation apparatus 40 is installed in the same country or region as the server 12, because there is no time difference, there would be no particular problem. However, when the content presentation apparatus 40 and the server 12 are installed in different countries or regions and when there is a time difference, if content and its presentation schedule are distributed on the basis of the time in a place where the server 12 is installed, inconvenience may occur on the content presentation apparatus 40 side.

For example, if the time at which the content presentation apparatus 40 receives distribution overlaps the business hours, the lines of the network 20 may be congested, or reproduction of content by the content presentation apparatus 40 may be interrupted. Therefore, the administrator may conceivably take the time difference into consideration and set the presentation schedule; however, the operation is burdensome, and it takes time to set the presentation schedule.

In the first embodiment, content and its presentation schedule are distributed by taking into consideration not only the amount of traffic but also the time difference, thereby avoiding the above-described inconvenience (problem).

FIG. 2 is an illustration of an example of a calendar schedule screen 100 displayed on the display device 14 connected to the server 12 illustrated in FIG. 1. For example, a menu image 102 for selecting (setting) the place to present content, and a menu image 104 for selecting (setting) the year and month to present content are displayed in an upper portion of the calendar schedule screen 100. A calendar image 106 is displayed below the menu images 104 and 104.

The menu image 102 is an image of a user interface for selecting the place where the display device 50 is installed, that is, the place to present content. When a button at the right end is designated (clicked), a pull-down menu is displayed. The pull-down menu displays a list of places to present content, and one of the places is selectable. For example, the pull-down menu set in the menu image 102 displays various countries or countries and areas (regions) such as Japan, Korea, China, Hong Kong, Taiwan, the United States of America (USA) (New York (N.Y.)), USA (Chicago), USA (Denver), USA (Phoenix), USA (Los Angeles), USA (Anchorage), USA (Hawaii), England, France, Germany, and so forth in text to be selectable. Not only countries, but also regions are made selectable because even in the same country, some countries have time differences between its regions. In the menu image 102, the currently selected place is displayed in text as a presentation place in a display area at the center.

The menu image 104 is provided to select the year and month to present content. When a button at the right end is designated, a pull-down menu is displayed. For example, the pull-down menu set in the menu image 104 displays years and months from the year and month including the today's date onward in text to be selectable. In the menu image 104, the currently selected year and month are displayed in text in a display area at the center. As is clear from FIG. 2, the left side of the slash indicates the year, and the right side of the slash indicates the month. On the calendar schedule screen 100, the calendar image 106 for the year and month selected in the menu image 104 is displayed.

The calendar image 106 is an image of a user interface that imitates the actual calendar. A display field for indicating the week number is provided at the left end of the calendar image 106, and a display field for indicating the day of the week is provided at the top end of the calendar image 106. For example, it is displayed on the calendar image 106 illustrated in FIG. 2 that each week starts from Sunday. A display area for displaying a time period for presenting content is assigned to each date. Note that each time period displayed on the calendar image 106 is a period from the start date and time to the end date and time for presenting content on a corresponding day, and a detailed time schedule is separately set. Because a time schedule may spread across two days, as is clear from FIG. 2, the end date and time displayed on each day of the calendar image 106 may spread to the next day.

As is illustrated in the calendar image 106, two time periods for presenting content are displayed. In the first embodiment, the time period stated in the upper row is a time period for presenting content in a place to present content (this will be referred to as a "presentation time period" for the sake of convenience). Meanwhile, the time period stated in the lower row is a time period in a place ("Japan" in the first embodiment) where the server 12 for distributing content is installed, which corresponds to the local time zone (this will be referred to as a "distribution source time period" for the sake of convenience).

The place where the server 12 is installed is set (initially set) by the administrator of the server 12, which will be omitted in the illustrations.

In the example illustrated in FIG. 2, the place to present content is USA (NY), and the field of Dec. 1, 2016 (Thursday) on the calendar displays, as a presentation time period for presenting content, the period from Dec. 1, 2016 (Thursday), 11:00 to Dec. 2, 2016 (Friday), 10:00. In association with this presentation time period, the distribution source time period in the place where the server 12 is installed (Japan) is displayed in parentheses. The presentation time period and the distribution source time period are determined (set) when the administrator of the server 12 assigns a desired time schedule to a desired date. For example, when the administrator of the server 12 selects (clicks) the date to set the time schedule on the calendar image 106 and selects the time schedule to assign, a presentation time period determined by the start date and time and the end date and time of the selected time schedule and a distribution source time period corresponding to the presentation time period are displayed in the display area of that date.

Note that the time difference between the place where the server 12 is installed and the place to present content is calculated in advance, and, when a presentation time period is determined in accordance with the time schedule, the distribution source time period is also determined in accordance with the time difference.

When a desired time schedule is assigned to a desired date (which is not displayed in the calendar image 106), identification information (such as a file name) of the desired time schedule that has been assigned is linked to the desired date.

Furthermore, when the administrator ends the setting of the calendar schedule and gives an instruction to save the calendar schedule, data corresponding to the set calendar schedule is saved in internal memory (such as a hard disk drive (HDD)) of the server 12 or the database 16. At this time, for example, data corresponding to the calendar schedule is given a file name that is identifiable from the other calendar schedules.

In the present specification, for the sake of simplicity, when describing a time period (period), the end time is described as the same time as the start time of the next time period. Actually, the end time of a time period does not include the start time of the next time period. For example, in the case of the time period (period) from 11:00 to 12:00, the end time of the time period is 11:59:59:99.

Figure 3:
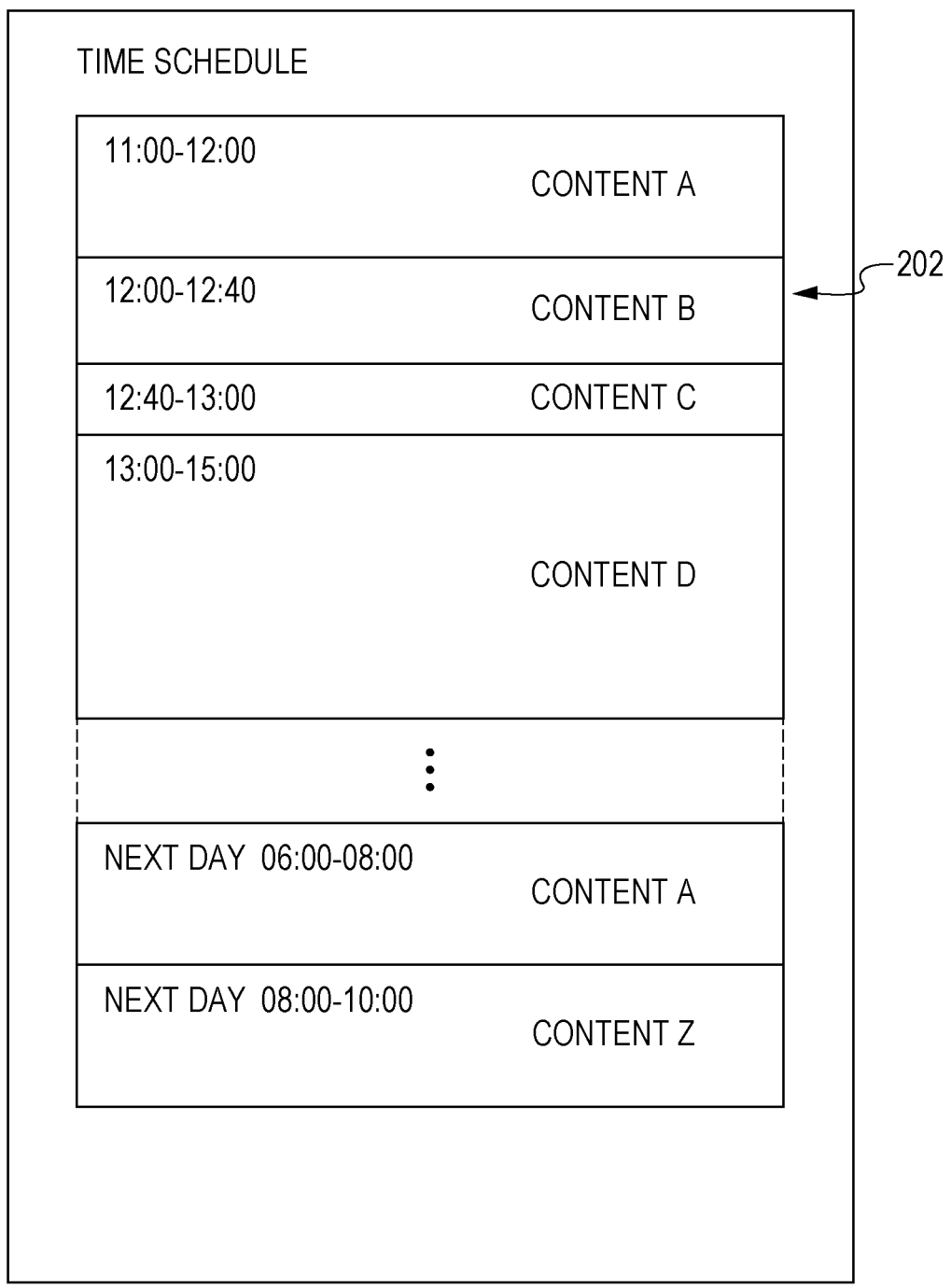
FIG. 3 is an illustration of an example of a time schedule screen displayed on the display device connected to the server illustrated in FIG. 1.

FIG. 3 is an illustration of an example of a time schedule screen 200. Note that FIG. 3 illustrates a state where a time schedule is set. The method of allocating content to a time schedule and the method of setting a time period for presenting the assigned content are arbitrary, and these setting methods are not the essential details of the present application; thus, a detailed description thereof will be omitted.

As illustrated in FIG. 3, a display area 202 for displaying the time period for presenting content and the type of content to be presented is provided on the time schedule screen 200. Note that the time period for presenting content is the time period in a country or a region where presentation (reproducing) of content is executed in accordance with the time schedule.

In the example illustrated in FIG. 3, it is set that content A will be presented from 11:00 to 12:00. In addition, it is set that content B will be presented from 12:00 to 12:40. Furthermore, it is set that content C will be presented from 12:40 to 13:00. The same applies to the other time periods, descriptions of which will be omitted.

In FIG. 3, the type of content is indicated by adding an alphabet letter, as in "content A". Therefore, the same alphabet letter indicates the same type of content.

A plurality of time schedules such as those illustrated in FIG. 3 is created in accordance with operations performed by the administrator, and data corresponding to each of the time schedules is stored (saved) to be separately identifiable in the internal memory (such as HDD) of the server 12 or the database 16, which will be omitted in the illustrations. For example, data of each of the time schedules is managed to be identifiable from items of data of the other time schedules using a file name. Therefore, the administrator distinguishes the set time schedules using file names and assigns the time schedules to the above-mentioned calendar schedule. For example, "content A" described above corresponds to a file name.

Figure 4:
FIG. 4 is an illustration for describing a method of determining a content distribution time.

FIG. 4 is an illustration for describing a method of determining (calculating) a content distribution time. FIG. 4 illustrates a time table in Japan where the server 12 is installed and a time table in USA (NY) where the content presentation apparatus 40 is installed. In Japan where the server 12 is installed, the business hours are from 9:00 to 18:00, and the period from 18:00 to 9:00 on the next day is outside the business hours (corresponding to a "first time period"). In USA (NY) where the content presentation apparatus 40 is installed, the business hours are also from 9:00 to 18:00, and the period from 18:00 to 9:00 on the next day is outside the business hours (corresponding to a "second time period").

Since there is a time difference between Japan and USA (NY), the time table in Japan where the server 12 is installed is shifted by the amount of the time difference in the example illustrated in FIG. 4. Note that the time difference between locations is stored in advance. The time difference between the location of the server 12 (Japan) and the location of the content presentation apparatus 40 (USA (NY)) is fourteen hours, and Japan is fourteen hours earlier than USA (NY).

In the first embodiment, a time period that is outside the business hours in both Japan and USA (NY) is determined as a distribution time. Therefore, the period from 18:00 to 24:00 (0:00 on the next day) which is outside the business hours in Japan overlaps the period from 3:00 to 9:00 which is outside the business hours in USA (NY) in the example illustrated in FIG. 4, and this time period is determined as a distribution time. For example, the distribution time is determined as the time period of the location of the server 12 since the server 12 distributes content.

Although time tables each including both the business hours and hours outside the business hours are illustrated for clarification in the example illustrated in FIG. 4, it is sufficient to store time tables outside the business hours and to compare these time tables since content is distributed outside the business hours.

Although a distribution time is determined by classifying hours into the business hours and the outside-business hours in the first embodiment, the classification need not be limited to this example.

For example, the traffic of the network 20 on the server 12 side is considered to be congested in the business hours. In addition, the content presentation apparatus 40 is considered to be presenting content in the business hours. Meanwhile, the traffic of the network 20 on the server 12 side outside the business hours is considered to be less congested than that in the business hours. In addition, the content presentation apparatus 40 is considered to be presenting no content outside the business hours.

Note that there is no distinction between the business hours and the outside-business hours in the case of 24-hour facilities. On the server 12 side, it is preferable to distribute content in a time period where the amount of traffic of the network 20 is small. On the content presentation apparatus 40 side, it is preferable to receive distribution of content in a time period where there are a few people (such as customers) who receive presentation of content. For example, a time period where the amount of traffic is small and a (quiet) time period where there are a few people who receive presentation of content can be obtained empirically by conducting the actual measurements or observations.

Therefore, it can be said that for the server 12 side, a time table for a time period (first time period) where the traffic is not congested (the amount of traffic is small) is stored; and, for the content presentation apparatus 40 side, a time table for a (quiet) time period (second time period) where no content is presented or there are a few people who receive presentation of content is stored. By comparing these time tables, a content distribution time is determined.

The server 12 determines that there is content to distribute if there is a content presentation apparatus 40 at a distribution destination whose presentation schedule has been set and if content and its presentation schedule are not distributed to this content presentation apparatus 40. If there is content to distribute, the server 12 distributes content and its presentation schedule to a content presentation apparatus 40 at a distribution destination when the current time is included in the determined (calculated) distribution time.

Note that to-be-distributed content includes one or more items of content assigned to a time schedule included in a presentation schedule.

A content presentation apparatus 40 at a distribution destination is determined from, for example, a presentation place set by the calendar schedule. If a plurality of content presentation apparatuses 40 are installed in a presentation place, the administrator who is setting a presentation schedule selects a content presentation apparatus 40 at a distribution destination, and the presentation schedule is linked to the content presentation apparatus 40 at the distribution destination.

In the server 12, the date and time is counted by a built-in clock circuit (real-time clock (RTC)), and the date and the current time can be known from the counted date and time.

In response to distribution of content and its presentation schedule from the server 12, the content presentation apparatus 40 receives the distributed content and presentation schedule, and reproduces the content in accordance with the presentation schedule. Therefore, the content is displayed on the display device 42 connected to the content presentation apparatus 40, and the content is presented to a person who views this content.

To briefly explain, the content presentation apparatus 40 refers to a calendar schedule included in the presentation schedule, and reads a time schedule assigned to the today's date from the presentation schedule. The content presentation apparatus 40 refers to the time schedule and reproduces content assigned to a time period including the current time. In other words, the content is reproduced in accordance with the time schedule.

In the content presentation apparatus 40, like the server 12, the date and time is counted by a built-in clock circuit (RTC), and the date and the current time can be known from the counted date and time.

In addition, to distribute content and its presentation schedule from the server 12 to the content presentation apparatus 40 at the distribution destination, if the power of the content presentation apparatus 40 at the distribution destination is off, the server 12 turns on (activates) the power of the content presentation apparatus 40 at the distribution destination, and then distributes content and its presentation schedule, a detailed description of which will be omitted. In this manner, when the content presentation apparatus 40 is activated by the server 12, after the content presentation apparatus 40 receives content and its presentation schedule or after the content presentation apparatus 40 receives content and its presentation schedule and completely reproduces the content in accordance with a time schedule, the power of the content presentation apparatus 40 is turned off.

Figure 5:
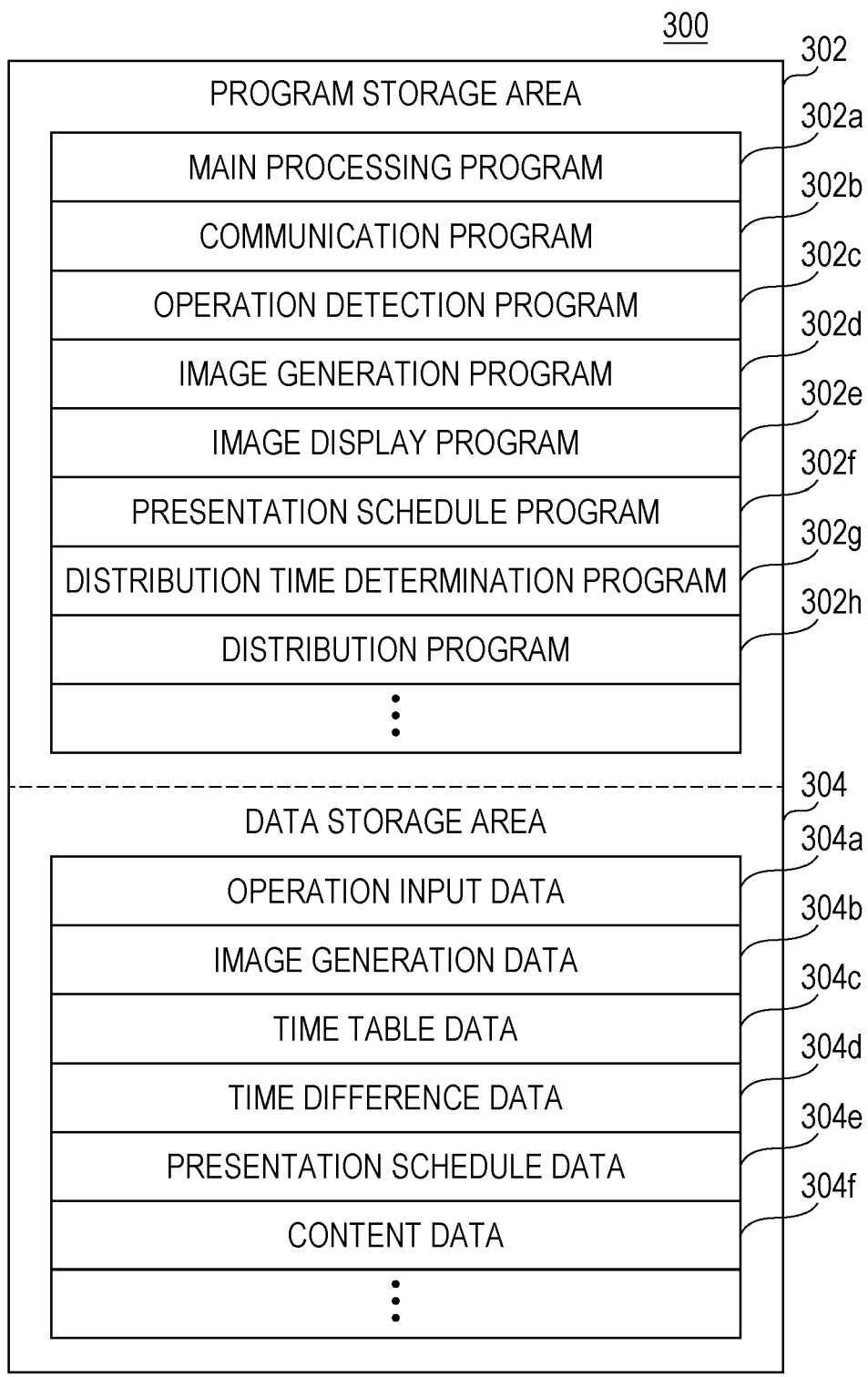
FIG. 5 is an illustration of an example of a memory map of random-access memory (RAM) of the server illustrated in FIG. 1.

FIG. 5 is an illustration of an example of a memory map 300 of the RAM 12*b* of the server 12 illustrated in FIG. 1. As illustrated in FIG. 5, the RAM 12*b* includes a program storage area 302 and a data storage area 304. The program storage area 302 stores a content distribution control program that runs on the server 12. The content distribution control program includes a main processing program 302*a*, a communication program 302*b*, an operation detection program 302*c*, an image generation program 302*d*, an image display program 302*e*, a presentation schedule program 302*f*, a distribution time determination program 302*g*, and a distribution program 302*h*. The content distribution control program is read from, for example, the HDD included in the server 12, and is stored in the RAM 12*b*.

The main processing program 302*a* is a program for executing the main routine of content distribution control processing. The communication program 302*b* is a program for communicating with other computers such as the content creation apparatus 30 and the content presentation apparatus 40.

The operation detection program 302*c* is a program for detecting an operation input (operation data) using an input device such as a keyboard. In accordance with the operation detection program 302*c*, the CPU 12*a* obtains operation data input from the input device, and stores the obtained operation data in the RAM 12*b* according to time series.

The image generation program 302*d* is a program for generating screen data on various display screens such as the above-described calendar schedule screen 100 and time schedule screen 200 using later-described image generation data 304*b*. Screen data is generated on video RAM (VRAM) by an image processing circuit (graphics processing unit (GPU)) under instructions of the CPU 12*a*, which will be omitted in the illustrations.

The image display program 302*e* is a program for displaying, on the display device 14, a display screen corresponding to screen data generated in accordance with the image generation program 302*d*. The CPU 12*a* controls the image processing circuit to output the screen data generated on the VRAM to the display device 14.

The presentation schedule program 302*f* is a program for setting the place to present content and the presentation schedule (calendar schedule and time schedule) for presenting content in accordance with an operation performed by the administrator. The distribution time determination program 302*g* is a program for determining (calculating) a content distribution time.

The distribution program 302*h* is a program for distributing content and its presentation schedule to the content presentation apparatus 40 which presents the content (content presentation apparatus 40 at the distribution destination) at the distribution time determined in accordance with the distribution time determination program 302*g*. To distribute content and its presentation schedule, the CPU 12*a* executes a communication process with the content presentation apparatus 40 at the distribution destination in accordance with the communication program 302*b*. To-be-distributed content is read from the database 16 and is stored once in the RAM 12*b*. Furthermore, a to-be-distributed presentation schedule is read from internal memory such as the HDD or from the database 16, and is stored once in the RAM 12*b*.

The program storage area 302 additionally stores a program for receiving content transmitted from the content creation apparatus 30 and managing the content in the database 16, a program for activating (Wake-on-LAN) the content presentation apparatus 40 whose power is turned off, and a program for executing other functions included in the server 12, which will be omitted in the illustrations.

The data storage area 304 stores operation input data 304a, image generation data 304b, time table data 304c, time difference data 304d, presentation schedule data 304e, and content data 304f.

The operation input data 304a is operation data output from an input device such as a keyboard, obtained by the CPU 12a, and stored according to time series. The image generation data 304b is data used in generating various display screens such as the calendar schedule screen 100 and the time schedule screen 200, and includes polygon data and texture data. The image generation data 304b is read from the HDD and is stored in the RAM 12b.

The time table data 304c is data on a time period outside the business hours in a place (location) where the server 12 is installed, and on a time period outside the business hours in each of places (locations) where the plurality of content presentation apparatuses 40 (display systems 50) are installed, and each time period is appended with a time difference from the reference time in the case of using world time.

The time difference data 304d is numerical data on a time difference between locations, and specifically is numerical data on a time difference between countries and/or regions selectable on the menu image 102 indicated on the calendar schedule screen 100.

The presentation schedule data 304e is data on a presentation schedule (calendar schedule and time schedule) for distributing content to the content presentation apparatus 40 at the distribution destination, and, as has been described above, is read from the internal memory such as HDD or from the database 16. The content data 304f is data on one or more items of content presented in accordance with the presentation schedule data 304e, and, as has been described above, is read from the database 16.

The data storage area 304 additionally stores other data necessary for running the content distribution control program. In addition, a counter (timer) and a flag necessary for running the content distribution control program are provided in the data storage area 304.

Figure 6:
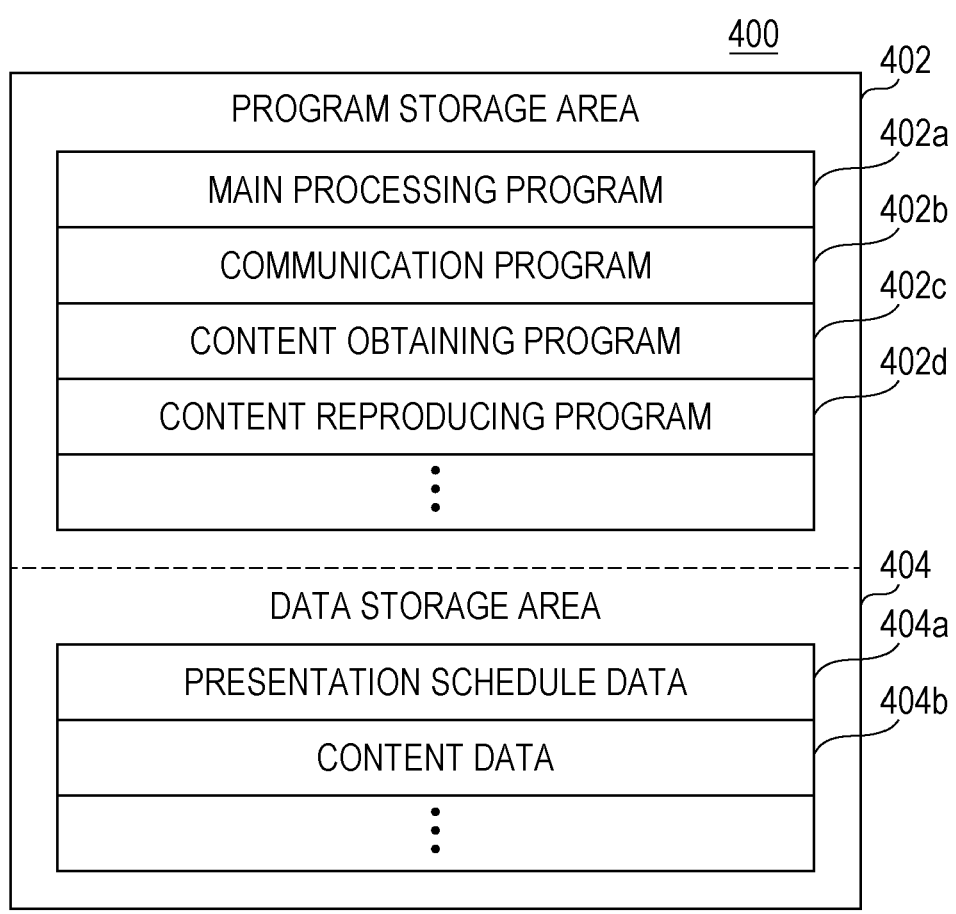
FIG. 6 is an illustration of an example of a memory map of RAM of a content presentation apparatus illustrated in FIG. 1.

FIG. 6 is an illustration of an example of a memory map 400 of RAM 40b of the content presentation apparatus 40 illustrated in FIG. 1. As illustrated in FIG. 6, the RAM 40b includes a program storage area 402 and a data storage area 404. The program storage area 402 stores a content presentation control program (information processing program) that runs on the content presentation apparatus 40. The content presentation control program includes a main processing program 402a, a communication program 402b, a content obtaining program 402c, and a content reproducing program 402d. The content presentation control program is read from, for example, an HDD included in the content presentation apparatus 40, and is stored in the RAM 40b.

The main processing program 402a is a program for executing the main routine of content presentation control processing (information processing). The communication program 402b is a program for communicating with other computers such as the server 12.

The content obtaining program 402c is a program for obtaining content, a calendar schedule, and a time schedule from the server 12.

The content reproducing program 402d is a program for reproducing content, which is obtained from the server 12 in accordance with the content obtaining program 402c, in accordance with a calendar schedule and a time schedule, which are similarly obtained from the server 12. Specifically, content such as a still image or a video image is reproduced, and is output to the display device 42 connected to the content presentation apparatus 40.

The program storage area 402 additionally stores a program for executing other functions included in the content presentation apparatus 40, which will be omitted in the illustrations.

In addition, the data storage area 404 stores presentation schedule data 404a and content data 404b.

The presentation schedule data 404a is the presentation schedule data 304e distributed from the server 12. The content data 404b is the content data 304f distributed from the server 12.

The data storage area 404 additionally stores other data necessary for running the content presentation control program. In addition, a counter (timer) and a flag necessary for running the content presentation control program are provided in the data storage area 404.

Figure 7:
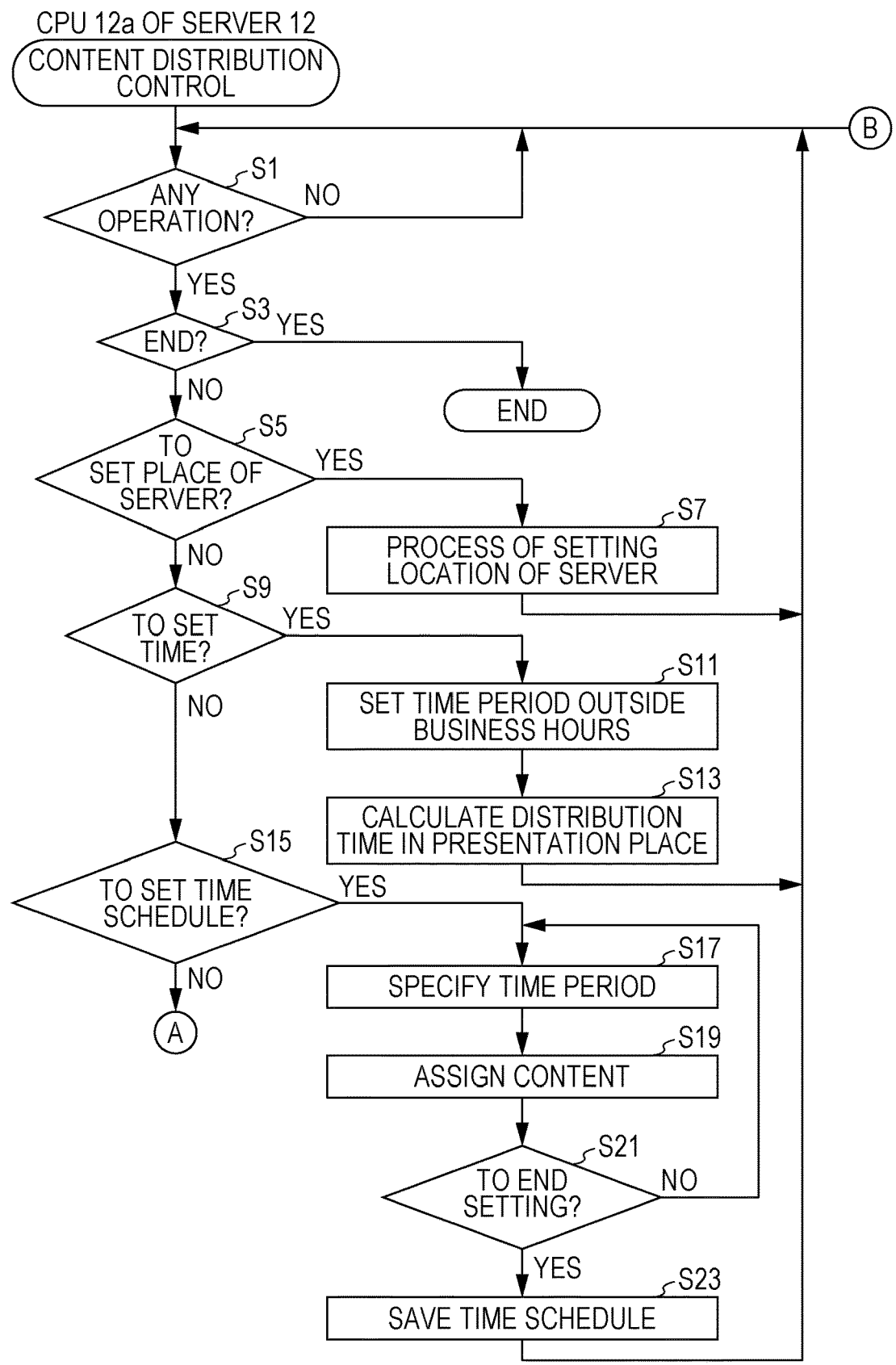
FIG. 7 is a flowchart illustrating part of an example of a content distribution control process executed by a central processing unit (CPU) of the server illustrated in FIG. 1.
Figure 8:
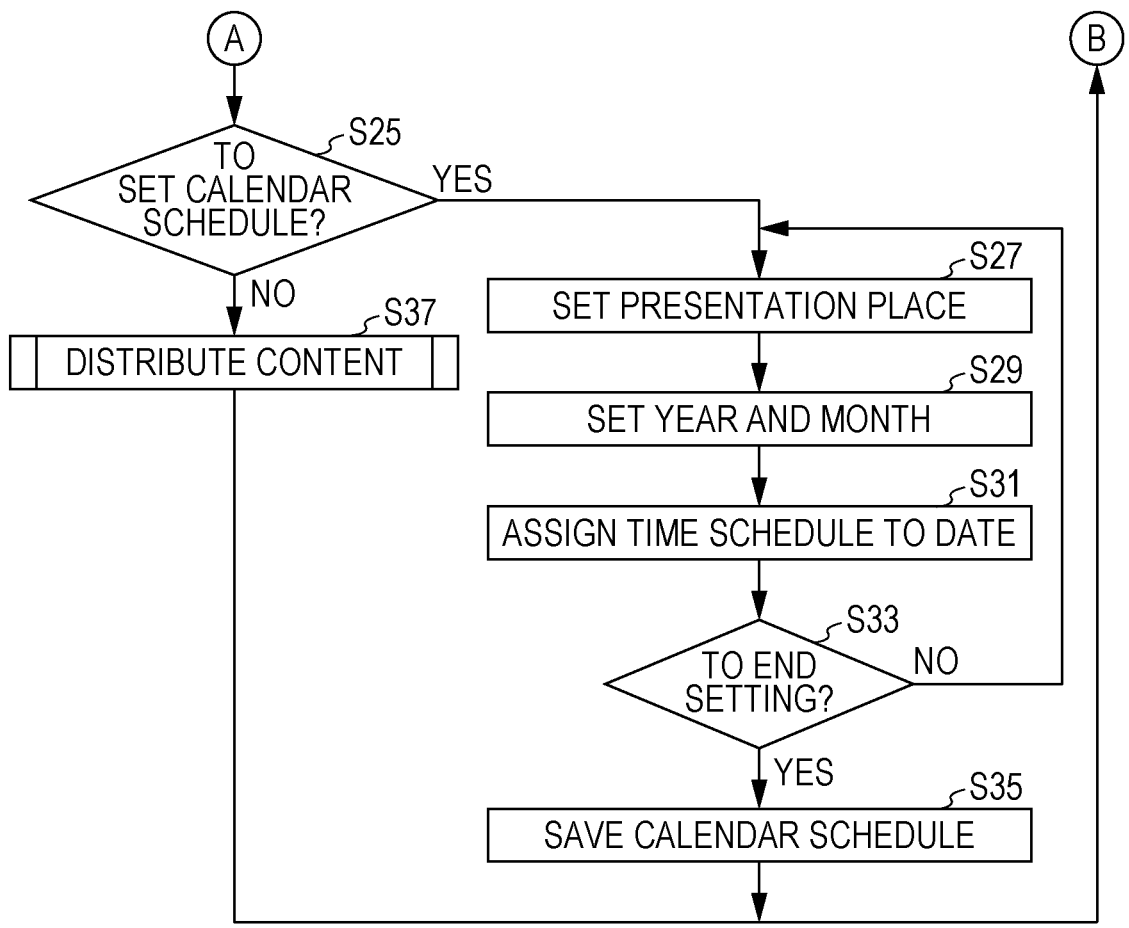
FIG. 8 is a flowchart illustrating another part of the content distribution control process executed by the CPU of the server illustrated in FIG. 1, which is subsequent to the flowchart in FIG. 7.

FIGS. 7 and 8 are flowcharts illustrating a content distribution control process executed by the CPU 12a of the server 12. For example, when the administrator of the server 12 gives an instruction to run the content distribution control program, as illustrated in FIG. 7, the content distribution control process starts, and the CPU 12a of the server 12 determines in step S1 whether there is an operation.

If the determination result in step S1 is "NO", that is, if there is no operation, the CPU 12a returns to step S1. In contrast, if the determination result in step S1 is "YES", that is, if there is an operation, the CPU 12a determines in step S3 whether to end the program. In other words, the CPU 12a determines whether the operation performed by the administrator of the server 12 is to end the content distribution control program.

If the determination result in step S3 is "YES", that is, if the instruction is to end the content distribution control program, the content distribution control process ends. In contrast, if the determination result in step S3 is "NO", that is, if the instruction is not to end the content distribution control program, the CPU 12a determines in step S5 whether the instruction is to set the place of the server 12. Here, the CPU 12a determines whether the operation performed by the administrator is to set the location of the server 12.

If the determination result in step S5 is "YES", that is, if the instruction is to set the place of the server 12, the CPU 12a executes in step S7 a process of setting the location of the server 12, and returns to step S1. In step S7, the CPU 12a sets the place selected by the administrator in the initial setting as the location of the server 12. In contrast, if the determination result in step S5 is "NO", that is, if the instruction is not to set the place of the server 12, the CPU 12a determines in step S9 whether the instruction is to set the time.

If the determination result in step S9 is "YES", that is, if the instruction is to set the time, the CPU 12a sets in step S11 a time period outside the business hours in accordance with an instruction given by the administrator. Here, a time period outside the business hours in a specified place (location) is set. In the next step S13, the CPU 12a calculates a distribution time in the presentation place, and returns to step S1. Not that, in step S13, the CPU 12a refers to the time table data 304c and the time difference data 304d to take into consideration the time difference as described above, and, from hours that overlaps hours outside the business hours in the place set this time and hours outside the business hours in the place where the server 12 is installed, a time period in the place where the server 12 is installed as the distribution time. Therefore, the already-calculated distribution time need not be calculated again. However, if the place where the server 12 is installed or the time period outside the business hours in the place where the server 12 is installed is changed, the CPU 12a calculates again in step S13 the distribution time in all the places that are the distribution destinations.

In contrast, if the determination result in step S9 is "NO", that is, if the instruction is not to set the time, the CPU 12a determines in step S15 whether the instruction is to set the time schedule. If the determination result in step S15 is "NO", that is, if the instruction is not to set the time schedule, the CPU 12a proceeds to step S25 illustrated in FIG. 8. In contrast, if the determination result in step S15 is "YES", that is, the instruction is to set the time schedule, the CPU 12a specifies in step S17 the time period in accordance with an operation performed by the administrator, and assigns in step S19 content in accordance with an operation performed by the administrator.

Because the CPU 12a executes processing in accordance with operations performed by the administrator in steps S17 and S19, if the administrator performs no operation, the processing is not executed and these steps are skipped. In response to an instruction given first to set the time schedule, the CPU 12a instructs the image processing circuit (GPU) to display the time schedule screen 200, such as that illustrated in FIG. 3, on the display device 14, which will be omitted in the illustrations.

In the next step S21, the CPU 12a determines whether an instruction has been given to end the setting of the time schedule. Here, the CPU 12a determines whether the administrator has given an instruction to end the setting of the time schedule. If the determination result in step S21 is "NO", that is, if no instruction has been given to end the setting of the time schedule, the CPU 12a returns to step S17. In contrast, if the determination result in step S21 is "YES", that is, if an instruction has been given to end the setting of the time schedule, the CPU 12a saves (updates) in step S23 the time schedule in the database 16, and returns to step S1.

Although the time schedule is saved in the database 16 after the setting of the time schedule ends in the first embodiment, if the administrator has not selected to save the time schedule, the CPU 12a returns to step S1 without executing the processing in step S23. The same applies to the case of the later-described calendar schedule.

As illustrated in FIG. 8, in step S25, the CPU 12a determines whether the instruction is to set the calendar schedule. If the determination result in step S25 is "NO", that is, if the instruction is not to set the calendar schedule, the CPU 12a executes in step S37 a later-described distribution process (see FIG. 9), and returns to step S1 illustrated in FIG. 7. In contrast, if the determination result in step S25 is "YES", that is, the instruction is to set the calendar schedule, the CPU 12a specifies in step S27 the content presentation place, that is, the place where the content presentation apparatus 40 is installed, in accordance with an operation performed by the administrator. In the next step S29, the CPU 12a sets the year and month for setting the schedule in accordance with an operation performed by the administrator. Furthermore, in the next step S31, the CPU 12a assigns the time schedule to a date included in the calendar image 106 in accordance with an operation performed by the administrator.

Because the CPU 12a executes processing in accordance with operations performed by the administrator in steps S27 to S31, if the administrator performs no operation, the processing is not executed and these steps are skipped. In response to an instruction given first to set the calendar schedule, the CPU 12a instructs the image processing circuit (GPU) to display the calendar schedule screen 100, such as that illustrated in FIG. 2, on the display device 14, which will be omitted in the illustrations. At the beginning of displaying the calendar schedule screen 100, the year and month are not selected; thus, the calendar image 106 is not displayed.

Next, in step S33, the CPU 12a determines whether an instruction has been given to end the setting of the calendar schedule. Here, the CPU 12a determines whether the administrator has given an instruction to end the setting of the calendar schedule. If the determination result in step S33 is "NO", that is, if no instruction has been given to end the setting of the calendar schedule, the CPU 12a returns to step S27. In contrast, if the determination result in step S33 is "YES", that is, if an instruction has been given to end the setting of the calendar schedule, the CPU 12a saves (updates) the calendar schedule in step S35, and returns to step S1.

Figure 9:
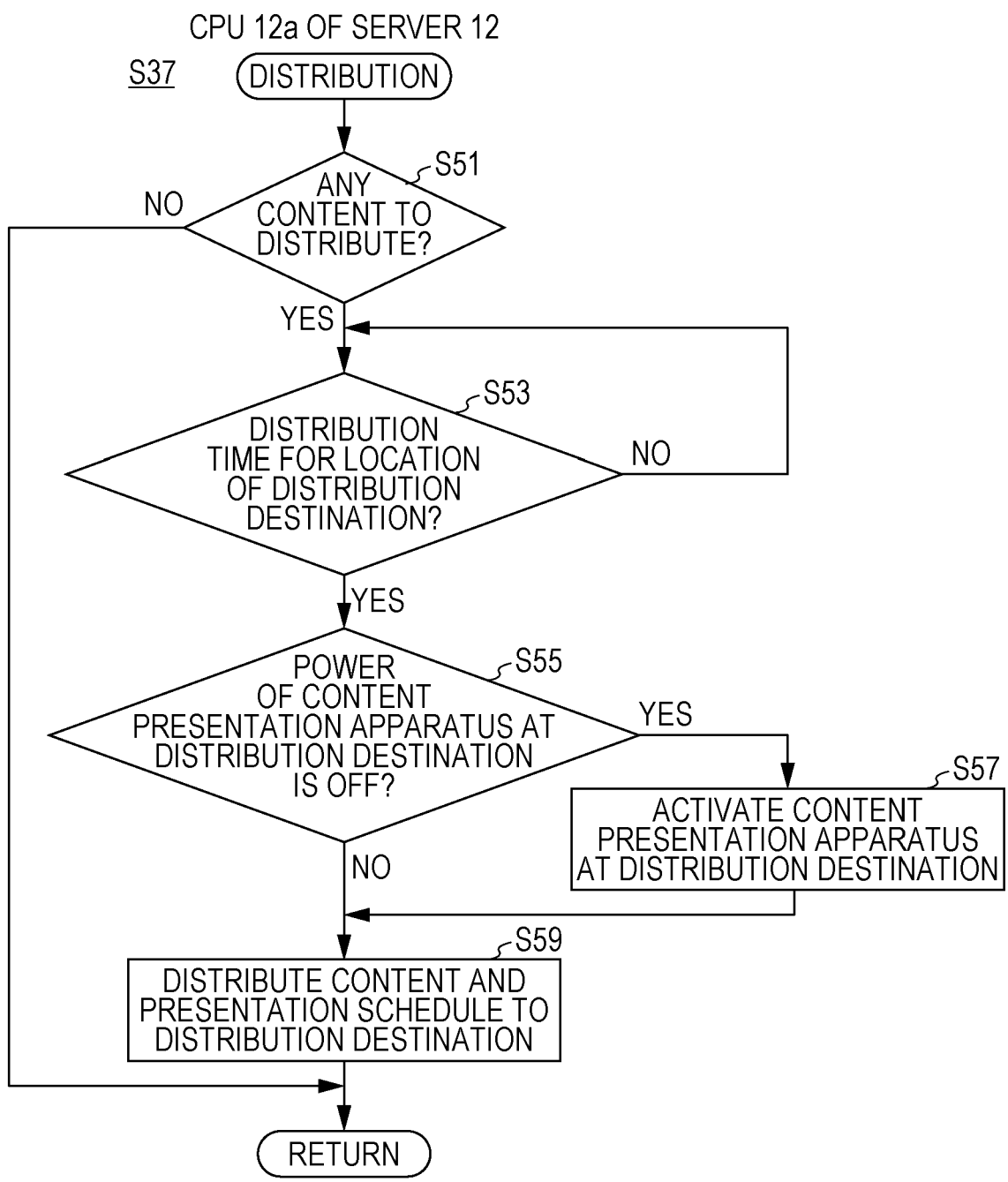
FIG. 9 is a flowchart illustrating an example of a content distribution process executed by the CPU of the server illustrated in FIG. 1.

FIG. 9 is a flowchart illustrating an example of the distribution process in step S37 illustrated in FIG. 8. As illustrated in FIG. 9, when the distribution process starts, the CPU 12a determines in step S51 whether there is content to distribute. The CPU 12a determines whether there is yet-to-be-distributed content.

If the determination result in step S51 is "NO", that is, if there is no content to distribute, the CPU 12a ends the distribution process, and returns to the content distribution control process illustrated in FIGS. 7 and 8. In contrast, if the determination result in step S51 is "YES", that is, if there is content to distribute, the CPU 12a determines in step S53 whether it is the distribution time for the location of the distribution destination. In other words, the CPU 12a determines whether there is a content presentation apparatus 40 at a distribution destination whose distribution time includes the current time, among content presentation apparatuses 40 at distribution destinations to which content has not been distributed yet.

If the determination result in step S53 is "NO", that is, if it is not the distribution time for the location of the distribution destination, the CPU 12a returns to the same step S53. In contrast, if the determination result in step S53 is "YES", that is, if it is the distribution time for the location of the distribution destination, the CPU 12a determines in step S55 whether the power of the content presentation apparatus 40 at the distribution destination is off.

If the determination result in step S55 is "NO", that is, if the power of the content presentation apparatus 40 at the distribution destination is on, the CPU 12a proceeds to step S59. In contrast, if the determination result in step S55 is "YES", that is, if the power of the content presentation apparatus 40 at the distribution destination is off, the CPU 12a activates in step S57 the content presentation apparatus 40 at the distribution destination, and proceeds to step S59. In step S57, the CPU 12a transmits a signal for activating the content presentation apparatus 40 at the distribution destination using the Wake-on-LAN function.

In step S59, the CPU 12a distributes content and its presentation schedule to the content presentation apparatus 40 at the distribution destination, and returns to the content distribution control process.

Figure 10:
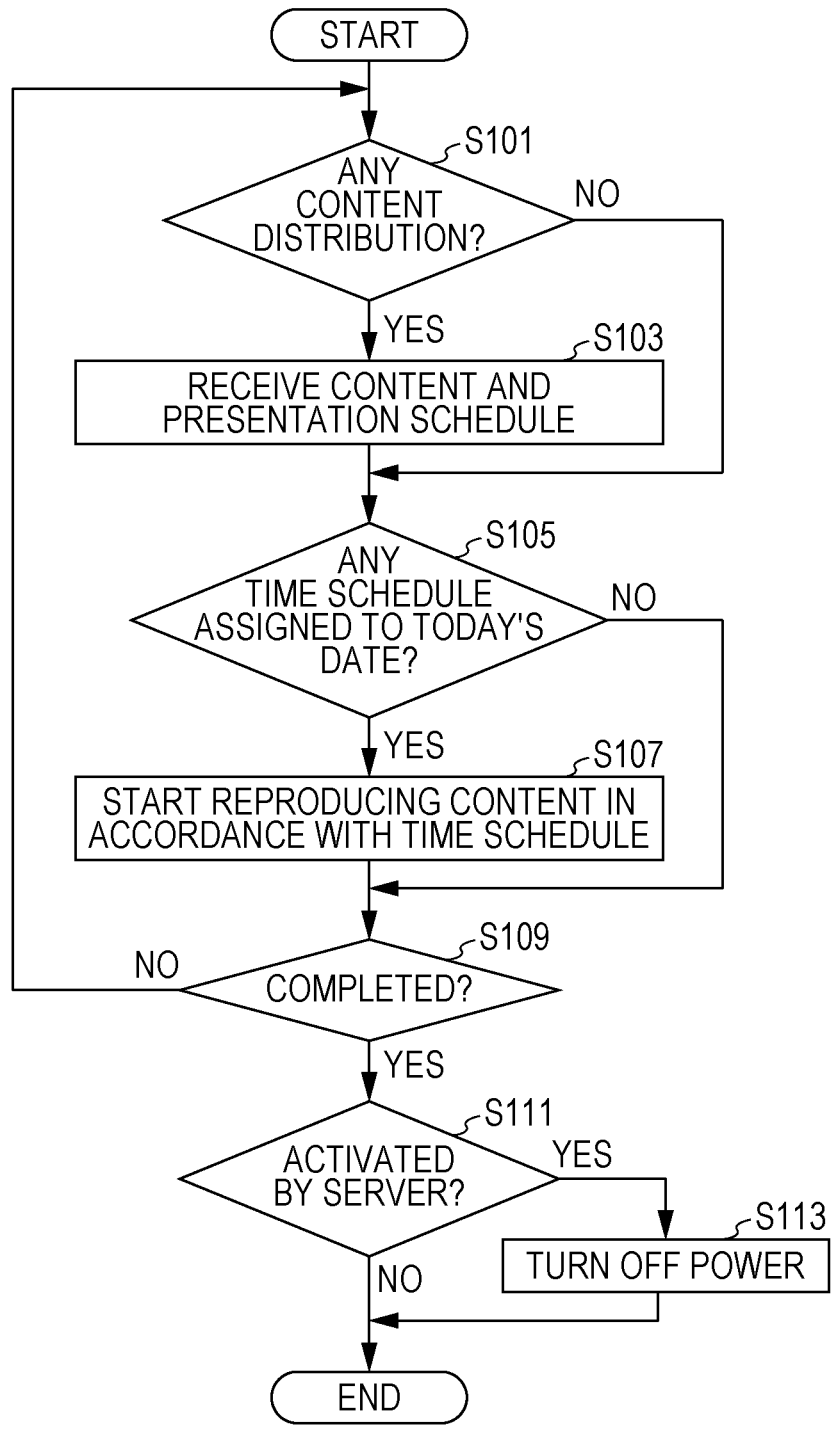
FIG. 10 is a flowchart illustrating an example of information processing executed by a CPU of the content presentation apparatus illustrated in FIG. 1.

FIG. 10 is a flowchart illustrating an example of the overall processing (information processing) executed by the CPU 40a of the content presentation apparatus 40 illustrated in FIG. 1. When the power of the content presentation apparatus 40 is turned on, as illustrated in FIG. 10, the CPU 40a starts the overall processing, and determines in step S101 whether there is distribution of content. In other words, the CPU 40a determines whether content and its presentation schedule have been distributed from the server 12.

If the determination result in step S101 is "NO", that is, if there is no distribution of content, the CPU 40a proceeds to step S105. In contrast, if the determination result in step S101 is "YES", that is, if there is distribution of content, the CPU 40a receives in step S103 content and its presentation schedule, and proceeds to step S105. Therefore, the presentation schedule data 404a and the content data 404b are stored (updated).

In step S105, the CPU 40a determines whether there is a time schedule assigned to the today's date. Here, the CPU 40a refers to a calendar schedule included in the presentation schedule data 404a, and determines whether a time schedule has been assigned to the field of the today's date.

If the determination result in step S105 is "NO", that is, if there is no time schedule for the today's date, the CPU 40a proceeds to step S109. In contrast, if the determination result in step S105 is "YES", that is, if there is a time schedule for the today's date, the CPU 40a starts in step S107 reproducing content in accordance with the time schedule for the today's date, and proceeds to step S109. In step S107, the CPU 40a instructs the image processing circuit and refers to the time schedule to read and reproduce content assigned to a time period including the current time from the content data 404b, and outputs the reproduced image data or video data to the display device 42.

In step S109, the CPU 40a determines whether the processing is completed. Here, the CPU 40a determines whether reception of the content and/or reproducing of the content in accordance with the time schedule is completed. If the determination result in step S109 is "NO", that is, if the processing is not completed, the CPU 40a returns to step S101. In contrast, if the determination result in step S109 is "YES", that is, if the processing is completed, the CPU 40a determines in step S111 whether the content presentation apparatus 40 has been activated by the server 12.

If the determination result in step S111 is "NO", that is, if the content presentation apparatus 40 has not been activated by the server 12, the overall processing ends. In contrast, if the determination result in step S111 is "YES", that is, if the content presentation apparatus 40 has been activated by the server 12, the CPU 40a turns off the power in step S113, and ends the overall processing.

According to the first embodiment, the content distribution time is determined by taking into consideration the time difference between the location of the distribution source and the location of the distribution destination in a time period where the amount of traffic is small.

Accordingly, content can be distributed by taking into consideration not only the amount of traffic, but also the time difference between the location of the distribution source and the location of the distribution destination.

Although the first embodiment has discussed the case where one time period that overlaps hours outside the business hours at the location of the distribution source and hours outside the business hours at the location of the distribution destination is determined as the distribution time, if there are two or more distribution times, it is sufficient to distribute content and its presentation schedule at one of the distribution times. In this case, which of the two or more distribution times is given priority may be determined according to a certain condition. For example, a certain condition may be the point that a time period outside the business hours of the distribution source or a time period outside the business hours of the distribution destination is a certain time period. Alternatively, a certain condition may be giving priority to the earliest time period among the two or more distribution times. Furthermore, among the two or more distribution times, a time period less than a certain time (such as two hours) may be excluded from being a distribution time.

Second Embodiment

The network system 10 according to a second embodiment is the same as that according to the first embodiment except for the point that distribution of content to a plurality of distribution destinations is additionally taken into consideration. Therefore, only the different details will be described, and descriptions of the overlapping details will be omitted or briefly given.

For example, in the case where calendar schedules are set for a plurality of locations at the same time, content is distributed to a plurality of locations of distribution destinations (content presentation apparatuses 40) at the same time. In this manner, to distribute content to a plurality of locations of distribution destinations (content presentation apparatuses 40), the server 12 according to the second embodiment determines the distribution time for each of the locations, like the first embodiment.

Figure 11:
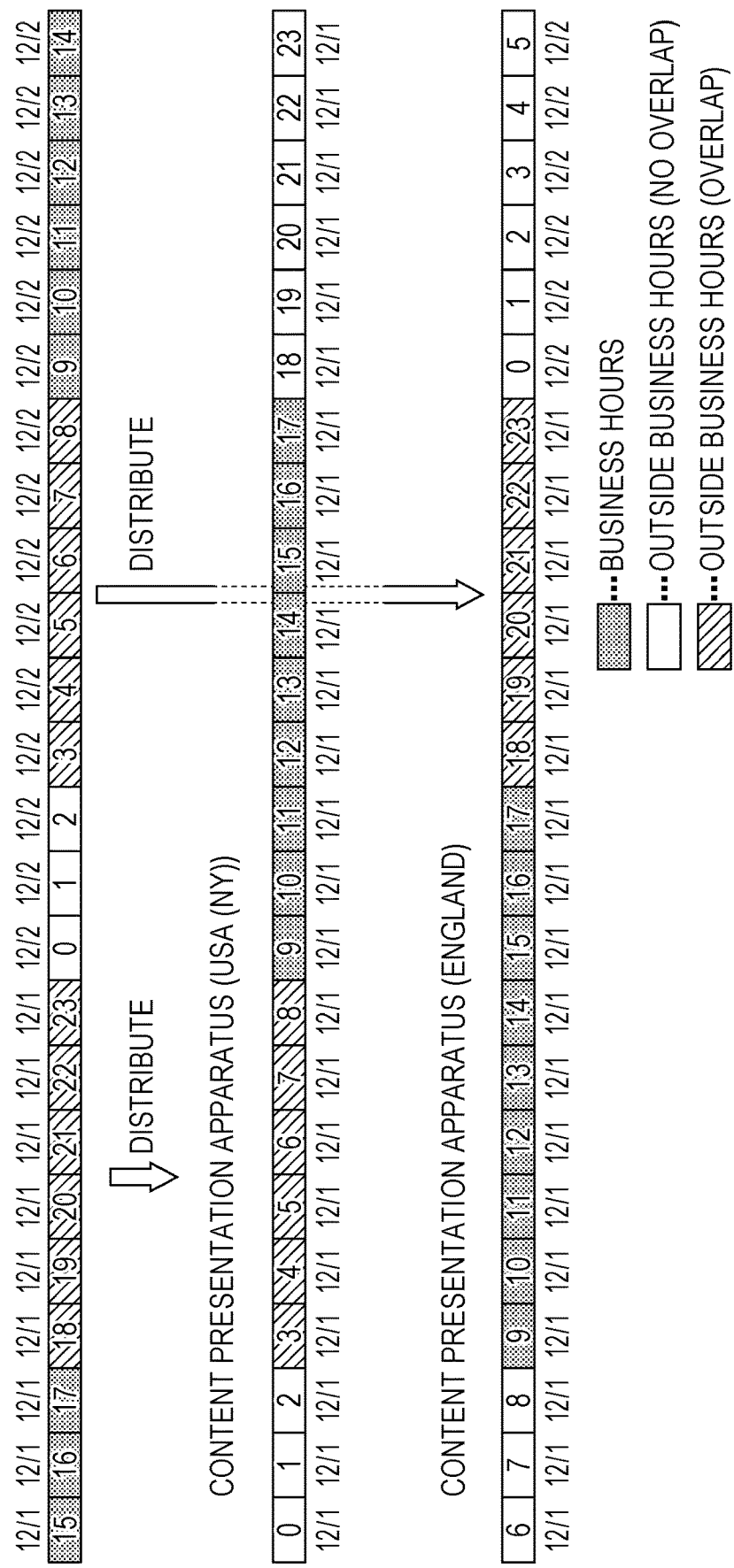
FIG. 11 is an illustration for describing a method of determining a content distribution time according to a second embodiment.

FIG. 11 is an illustration for describing a method of determining a distribution time for distributing content to a plurality of locations of distribution destinations. In the example illustrated in FIG. 11, the locations of distribution destinations are USA (NY) and England.

In the case where the location of a distribution destination is USA (NY), as has been described in the first embodiment, among hours outside the business hours, a time period that overlaps hours outside the business hours in Japan, which is the location of the distribution source, is from 3:00 to 9:00 in USA (NY). This time period is the distribution time for USA (NY).

In the case where the location of a distribution destination is England (the time difference is nine hours), among hours outside the business hours, a time period that overlaps hours outside the business hours in Japan, which is the location of the distribution source, is from 18:00 to 0:00 on the next day in England. This time period is the distribution time for England.

In this manner, when the distribution times do not overlap, content and its presentation schedule are distributed at each of the distribution times to a corresponding one of the locations (content presentation apparatuses 40).

However, when two or more distribution times determined for different locations (content presentation apparatuses 40) overlap, for the overlapping portions of the distribution times, a content presentation apparatus 40 at a distribution destination to which priority is given is determined in accordance with a certain rule. Here, the point that distribution times overlap means that the distribution times overlap at least partially. For example, when the distribution destinations are the first location and the second location and when the distribution time for the first location is from 16:00 to 22:00 in the time of the distribution source, if the distribution time for the second location is from 18:00 to 20:00, from 15:00 to 17:00, or from 21:30 to 23:00 in the time of the distribution source, the distribution times partially overlap.

In the second embodiment, a certain rule includes giving priority to a location (content presentation apparatus 40) whose distribution time is shorter. This is to reliably distribute content and its presentation schedule even when the distribution time is short.

Another certain rule includes giving priority to a location (content presentation apparatus 40) whose distribution time ends earlier. In other words, a location at which the content reproducing time starts earlier is given priority. This is to complete distribution of content and its presentation schedule before reproducing of the content starts.

The above-mentioned two rules, that is, the point that the distribution time is shorter and the point that the distribution time ends earlier, may be selectively applied. This is because there may be a case where the distribution time is not determined with either rule.

As has been described above, when distribution times for content presentation apparatuses 40 at different distribution destinations overlap, a content presentation apparatus 40 at a distribution destination to which content and its presentation schedule are distributed preferentially is determined in an overlapping portion (time period). Therefore, even if distribution times overlap, an increase in the amount of traffic due to this overlap may be avoided.

Figure 12:
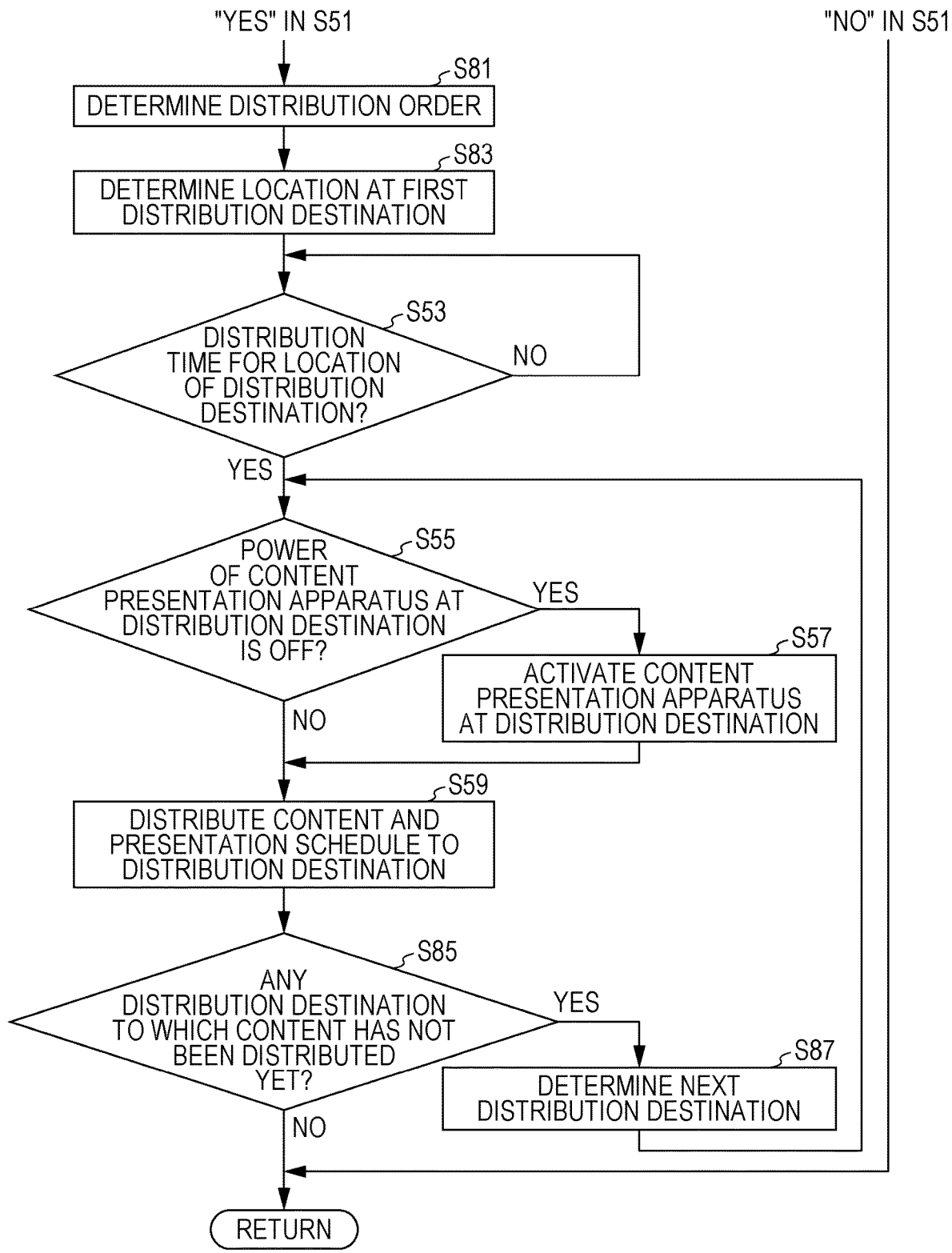
FIG. 12 is a flowchart illustrating part of a distribution process executed by the CPU of the server according to the second embodiment.

In the second embodiment, part of a distribution process in a content distribution control process executed by the CPU 12*a* of the server 12 is different in the second embodiment from the first embodiment. FIG. 12 is a flowchart illustrating part of a distribution process executed by the CPU 12*a* of the server 12 according to the second embodiment. The other part of the process, which is not illustrated, is the same as the distribution process described in the first embodiment. In addition, the details described in the first embodiment will be briefly described.

Specifically, as illustrated in FIG. 12, if the determination result in step S51 is "YES", the CPU 12*a* of the server 12 determines the order of distribution in step S81. The method of determining the distribution order is as has been described above. In the next step S83, the CPU 12*a* determines a content presentation apparatus 40 at the first distribution destination.

Next in step S53, the CPU 12*a* determines whether it is the distribution time for the location of the distribution destination. If the determination result in step S53 is "NO", the CPU 12*a* returns to the same step S53; however, if the determination result in step S53 is "YES", the CPU 12*a* determines in step S55 whether the power of the content presentation apparatus 40 at the distribution destination is off. If the determination result in step S55 is "NO", the CPU 12*a* proceeds to step S59. In contrast, if the determination result in step S55 is "YES", the CPU 12*a* activates the content presentation apparatus 40 at the distribution destination in step S57 and proceeds to step S59.

In step S59, the CPU 12*a* distributes content to the content presentation apparatus 40 at the distribution destination. In step S85, the CPU 12*a* determines whether there is any distribution destination to which content has not been distributed yet. If the determination result in step S85 is "YES", that is, if there is a distribution destination to which content has not been distributed yet, the CPU 12*a* determines the next distribution destination, and returns to step S53. In contrast, if the determination result in step S85 is "NO", that is, if there is no distribution destination to which content has not been distributed yet, the CPU 12*a* ends the distribution process, and returns to the content distribution control process.

In the second embodiment, like the first embodiment, content can be distributed by taking into consideration not only the amount of traffic, but also the time difference between the location of the distribution source and the location of the distribution destination.

According to the second embodiment, even if there is a plurality of locations of distribution destinations (content presentation apparatuses 40), a time period where the amount of traffic is small is determined as a distribution time for each content presentation apparatus 40, and the order of distributing content is determined on the basis of the distribution time determined for each content presentation apparatus 40. Therefore, content can be distributed to each location by taking the amount of traffic into consideration.

Third Embodiment

A third embodiment is the same as the first embodiment except for the point that the distribution time is determined by taking into consideration the point that the time difference changes according to season. Therefore, an overlapping description will be omitted or briefly given.

For example, countries or regions that use daylight saving time (DST) adjust standard time forward a certain time (such as one hour) in a certain period of one year. Therefore, when the location of the server 12 and the location of the content presentation apparatus 40 are different countries or regions and when at least one of the locations is a DST-observing country or region, a certain time to be shifted forward needs to be taken into consideration when calculating the distribution time in a certain period where DST is in effect.

For DST-observing countries or regions, a certain period where DST is in effect and a certain time to be shifted forward for DST are stored to be linked with a time schedule.

FIG. 13 is an illustration for describing a method of calculating (determining) a distribution time in a certain period where DST is in effect in the case where DST is adopted.

As illustrated in FIG. 13, the location of the server 12 is Japan, and the location of the content presentation apparatus 40 is USA (NY). In this case, to calculate a content distribution time in a certain period where DST is in effect, the time difference between Japan and USA (NY) is changed by a certain time shifted forward in response to DST becoming in effect.

In the example illustrated in FIG. 13, to distribute content from the server 12 from 0:00 to 24:00 on December 1st in the date and time of USA (NY), which is within a certain period where DST is in effect in USA (NY), the standard time is forwarded one hour in USA (NY). Thus, as has been discussed in the first embodiment, the time table in Japan where the server 12 is installed is adjusted backward one hour with reference to the time table in USA (NY).

Therefore, a time period that overlaps hours outside the business hours in USA (NY) and hours outside the business hours in Japan is from 18:00 on December 1st to 23:00 on December 1st in the date and time of Japan where the server 12 is installed, and this period is calculated (determined) as the content distribution time.

In other words, calculation of the distribution time in step S13 in the content distribution control process in the third embodiment takes into consideration the time difference changed by a certain time forwarded by DST.

As illustrated in FIG. 13, although 8:00 to 9:00 on December 2nd in the date and time of Japan where the server 12 is installed is also calculated as a distribution time, this distribution time is excluded from being a distribution time since it is short.

According to the third embodiment, content can be distributed in a time period where the amount of traffic is small by taking into consideration the time difference changed by a certain time forwarded by DST.

A modification of the third embodiment is additionally applicable to the second embodiment. In this case, all the countries or regions of the distribution destinations need not observe DST. In other words, the time difference only needs to be changed for content presentation apparatuses 40 installed in DST-observing countries or regions.

The screens and specific numerals cited in the above-described embodiments are only one example, and are appropriately changeable in accordance with the actual products. The order of steps illustrated in each of the flowcharts may be appropriately changed when the same effects are achieved.

The present disclosure contains subject matter related to that disclosed in Japanese Priority Patent Application JP 2016-237677 filed in the Japan Patent Office on Dec. 7, 2016, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An apparatus that distributes content and a presentation schedule of the content to a plurality of content presentation apparatuses, comprising:
  a storage that stores a first time period when traffic of a network in a first place where the apparatus is installed is not congested and a second time period when the content is not presented by each of the plurality of content presentation apparatuses or when there are fewer people who receive presentation of the content in association with a second place than a number of people who receive presentation of the content at other times where each of the plurality of content presentation apparatuses is installed;
  distribution time determination circuitry that determines, upon determination of a content presentation apparatus at a distribution destination, the content to be distributed, and the presentation schedule to be distributed, a time period when the first time period and the second time period for the content presentation apparatus at the distribution destination overlap as a distribution time by taking into consideration a time difference between the first place and the second place where the content presentation apparatus at the distribution destination is installed;
  distribution circuitry that distributes the content and the presentation schedule to the content presentation apparatus at the distribution destination at the distribution time determined by the distribution time determination circuitry; and
  priority determination circuitry that determines, if a plurality of distribution times determined for the content presentation apparatuses at the plurality of distribution destinations overlap at least partially, a content presentation apparatus at a distribution destination to which the content and the presentation schedule are distributed preferentially, in accordance with a certain rule, wherein
  upon determination of content presentation apparatuses at a plurality of distribution destinations, the distribution time determination circuitry determines a distribution time when the first time period and the second time period for each of the content presentation apparatuses at the plurality of distribution destinations overlap by taking into consideration a time difference between the first place and the second place where each of the content presentation apparatuses at the plurality of distribution destinations is installed.

2. The apparatus according to claim 1, wherein the certain rule includes giving priority to a content presentation apparatus at a distribution destination whose distribution time is shorter.

3. The apparatus according to claim 1, wherein the certain rule includes giving priority to a content presentation apparatus at a distribution destination whose distribution time ends earlier.

4. The apparatus according to claim 1, wherein the time difference is changed in accordance with a change of standard time.

5. A distribution control method for an apparatus that distributes content and a presentation schedule of the content to a plurality of content presentation apparatuses, the apparatus including a storage that stores a first time period when traffic of a network in a first place where the apparatus is installed is not congested and a second time period when the content is not presented by each of the plurality of content presentation apparatuses or when there are fewer people who receive presentation of the content in association with a second place than a number of people who receive presentation of the content at other times where each of the plurality of content presentation apparatuses is installed, the distribution control method comprising:
  determining, upon determination of a content presentation apparatus at a distribution destination, the content to be distributed, and the presentation schedule to be distributed, a time period when the first time period and the second time period for the content presentation apparatus at the distribution destination overlap as a distribution time by taking into consideration a time difference between the first place and the second place where the content presentation apparatus at the distribution destination is installed;
  distributing the content and the presentation schedule to the content presentation apparatus at the distribution destination at the determined distribution time; and
  determining if a plurality of distribution times determined for the content presentation apparatuses at the plurality of distribution destinations overlap at least partially, a content presentation apparatus at a distribution destination to which the content and the presentation schedule are distributed preferentially, in accordance with a certain rule,
  wherein, upon determination of content presentation apparatuses at a plurality of distribution destinations, determining a distribution time when the first time period and the second time period for each of the content presentation apparatuses at the plurality of distribution destinations overlap by taking into consideration a time difference between the first place and the second place where each of the content presentation apparatuses at the plurality of distribution destinations is installed.

6. A distribution system comprising:

a plurality of content presentation apparatuses; and an apparatus that distributes content and a presentation schedule of the content to the plurality of content presentation apparatuses, wherein each of the plurality of content presentation apparatuses includes:

receiving circuitry that receives the content and the presentation schedule distributed from the apparatus; and presentation circuitry that presents the content received by the receiving circuitry in accordance with the presentation schedule received by the receiving circuitry, and wherein the apparatus includes:

a storage that stores a first time period when traffic of a network in a first place where the apparatus is installed is not congested and a second time period when the content is not presented by each of the plurality of content presentation apparatuses or when there are fewer people who receive presentation of the content in association with a second place than a number of people who receive presentation of the content at other times where each of the plurality of content presentation apparatuses is installed;

distribution time determination circuitry that determines, upon determination of a content presentation apparatus at a distribution destination, the content to be distributed, and the presentation schedule to be distributed, a time period when the first time period and the second time period for the content presentation apparatus at the distribution destination overlap as a distribution time by taking into consideration a time difference between the first place and the second place where the content presentation apparatus at the distribution destination is installed;

distribution circuitry that distributes the content and the presentation schedule to the content presentation apparatus at the distribution destination at the distribution time determined by the distribution time determination circuitry; and priority determination circuitry that determines, if a plurality of distribution times determined for the content presentation apparatuses at the plurality of distribution destinations overlap at least partially, a content presentation apparatus at a distribution destination to which the content and the presentation schedule are distributed preferentially, in accordance with a certain rule, and upon determination of content presentation apparatuses at a plurality of distribution destinations, the distribution time determination circuitry determines a distribution time when the first time period and the second time period for each of the content presentation apparatuses at the plurality of distribution destinations overlap by taking into consideration a time difference between the first place and the second place where each of the content presentation apparatuses at the plurality of distribution destinations is installed.

* * * * *